US012302808B2

(12) United States Patent
Guerrero

(10) Patent No.: US 12,302,808 B2
(45) Date of Patent: May 20, 2025

(54) METHOD AND APPARATUS FOR STIMULATING PLANT GROWTH

(71) Applicant: Romina Guerrero, Sarasota, FL (US)

(72) Inventor: Romina Guerrero, Sarasota, FL (US)

( * ) Notice: Subject to any disclaimer, the term of this patent is extended or adjusted under 35 U.S.C. 154(b) by 130 days.

(21) Appl. No.: 18/295,040

(22) Filed: Apr. 3, 2023

(65) Prior Publication Data
US 2024/0324516 A1 Oct. 3, 2024

(51) Int. Cl.
*A01G 7/00* (2006.01)
*A01G 7/04* (2006.01)
*H01Q 1/36* (2006.01)
*H01Q 21/00* (2006.01)

(52) U.S. Cl.
CPC ............... *A01G 7/04* (2013.01); *H01Q 1/364* (2013.01); *H01Q 21/00* (2013.01)

(58) Field of Classification Search
CPC  A01G 7/04; H01Q 1/36; H01Q 1/364; H01Q 21/00
See application file for complete search history.

(56) References Cited

U.S. PATENT DOCUMENTS 11,293,910 B2 * 4/2022 Benfey .................. G01R 27/26

FOREIGN PATENT DOCUMENTS

| CN | 210694172 U | * | 6/2020 |
| CN | 220960062 U | * | 5/2024 |
| JP | WO2013145189 A1 | * | 8/2015 |

* cited by examiner

*Primary Examiner* — Tho G Phan
(74) *Attorney, Agent, or Firm* — Larson & Larson; Frank Liebenow; Justin P. Miller

(57) ABSTRACT

An apparatus and method for stimulating plant growth includes a plurality of antennas. Each antenna of the plurality of antennas is made of a strand of copper wire. There is an elongated conductive shaft to which each antenna is electrically and physically connected at a first end of the elongated conductive shaft by conductive tape. In some embodiments, a quartz crystal is electrically and physically connected to the first end of the elongated conductive shaft by the conductive tape. In some embodiments, the antennas are copper wire that are each less than or equal to 6 inches long, the quartz crystal is less than or equal to 4 inches long, and the conductive shaft is made of copper and is less than or equal to 24 inches long.

20 Claims, 5 Drawing Sheets

METHOD AND APPARATUS FOR STIMULATING PLANT GROWTH

FIELD OF THE INVENTION

This invention relates to the field of horticulture and more particularly to an apparatus for stimulating plant growth.

BACKGROUND OF THE INVENTION

Electromagnetic radiation is present in the environment. There are many sources of electromagnetic radiation such as the sun, nearby electrical devices, wireless communications devices, radio stations, and the like. Such electromagnetic radiation constantly provides small amounts of energy to receiving devices. Typically, the receiving device is an intended recipient of the electromagnetic radiation, for example, an antenna of a cellular phone is connected to a radio frequency transceiver and receives and emits electromagnetic radiation to communicate with a cell tower.

Various environmental parameters affect plant growth, including soil moisture, leaf moisture, soil quality, soil nutrients, available sun light and artificial light. It is also known that small electric currents can stimulate plant growth in addition to this list.

What is needed is an apparatus that will harness the electromagnetic radiation and channel small amounts of electricity into the soil surrounding a plant to stimulate growth of a plant.

SUMMARY OF THE INVENTION

In one embodiment, an apparatus for stimulating plant growth is disclosed including a plurality of antennas. Each antenna of the plurality of antennas is made of a strand of conductive material. Each antenna is electrically and physically connected to a first end of a conductive shaft. The conductive shaft is elongated and is for transferring electric currents from the plurality of antennas into a soil.

In another embodiment, an apparatus for stimulating plant growth is disclosed including a plurality of antennas. Each antenna of the plurality of antennas is made of a strand of copper wire. There is an elongated conductive shaft to which each antenna is electrically and physically connected at a first end of the elongated conductive shaft by conductive tape. A quartz crystal is electrically and physically connected to the first end of the elongated conductive shaft by the conductive tape.

In another embodiment, a method of stimulating growth of a plant that is planted in soil is disclosed. The method includes physically and electrically connecting a plurality of antennas to a first end of a conductive shaft and inserting a distal second end of the conductive shaft into the soil near the plant. Each antenna of the plurality of antennas thereby receiving electric currents and conducting the electric currents into the conductive shaft. Respectively, the conductive shaft conducts the electric currents into the soil where moisture and salts within the soil conduct the electric currents to the plant for improving growth of the plant.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
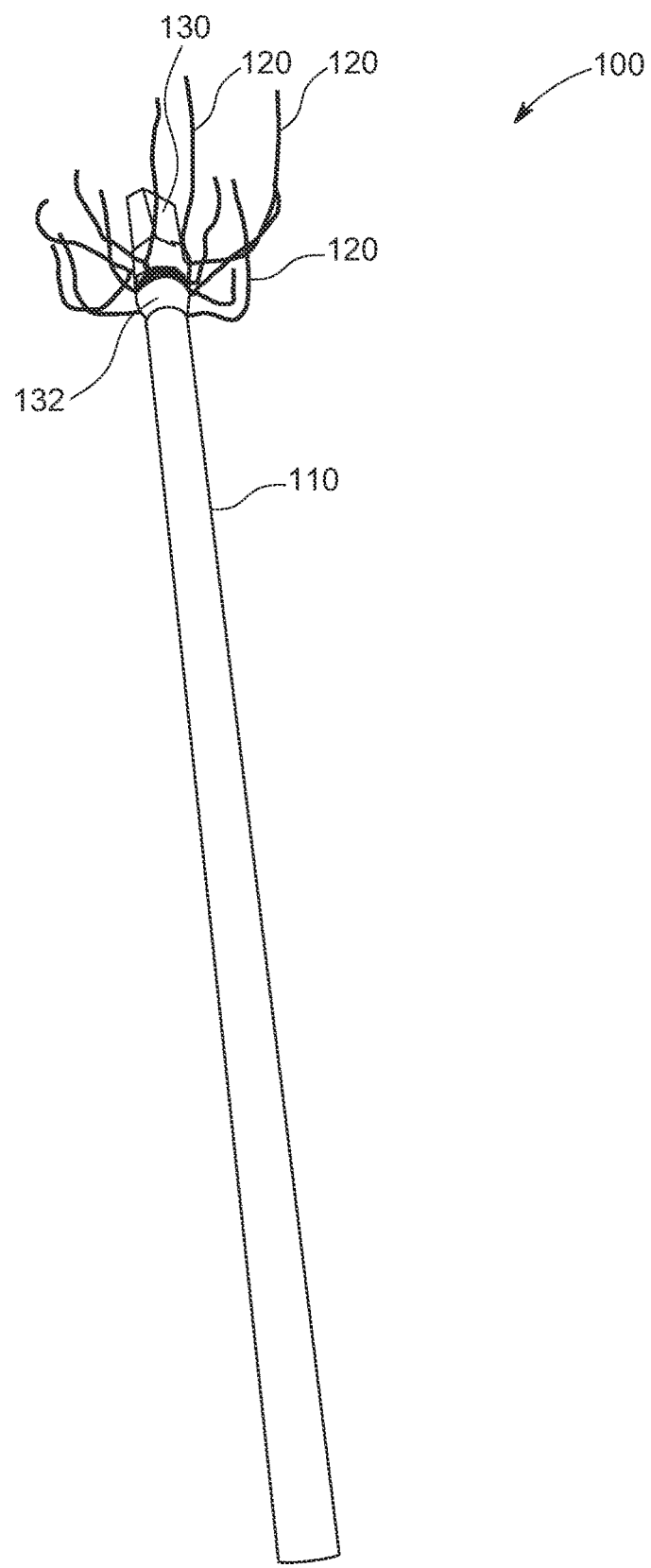
FIG. 1 illustrates an elevational view of an apparatus for stimulating plant growth.

Reference will now be made in detail to the presently preferred embodiments of the invention, examples of which are illustrated in the accompanying drawings. Throughout the following detailed description, the same reference numerals refer to the same elements in all figures.

In general, the Method and Apparatus for Stimulating Plant Growth is somewhat of a flower having copper wire for petals, a quartz crystal for the center of the flow and a copper rod for the stem of the flower.

Referring to FIG. 1, an elevational view of an apparatus for stimulating plant growth 100 is shown. As discussed, it is known that small amounts of electric current in the soil in which a plant's roots are held will stimulate improved growth of the plant. The apparatus for stimulating plant growth 100 provides such small amounts of electric currents by way of a plurality of petals or antennas that receive radio frequency emissions from any sources, including, but not limited to, the sun, nearby electrical devices, wireless communications devices, radio stations. The plurality of antennas 120 conduct the small amounts of electric currents into the soil through a first end of a conductive shaft 110 that is an elongated member that conducts electricity, for example, a copper tube or copper pipe. Each antenna of the plurality of antennas 120 is made of a strand of a conductive material, for example, a copper wire. A second, distal end of the conductive shaft 110 is inserted into the soil in the vicinity of the plants that are to be stimulated into improved growth, thereby delivering the small amounts of electric currents into the soil. In some embodiments, a quartz crystal 130 is also provided and surrounded by the plurality of antennas 120 for enhancing collection of the small amounts of electric currents. Although there are many ways to affix the quartz crystal 130 to the first end of the conductive shaft 110, in the embodiments shown, conductive tape 132 is used, providing a path of conductivity between the quartz crystal 130 and the conductive shaft 110.

Although the plurality of antennas 120 is anticipated to be any number of antennas are anticipated, in one embodiment 12 antennas has been found to work well. Likewise, it is fully anticipated that the length of each antenna of the plurality of antennas 120 be any length, though it has been found that a length of less than six inches works well. Additionally, although in the embodiments shown, each antenna of the plurality of antennas 120 are of equal or similar length, there is no requirement so equal or similar length. Likewise, although there is no restriction on the size of the quartz crystal 130, it has been found that a quartz crystal 130 of less than or equal to four inches works well. Likewise, although there is no restriction as to the length and diameter of the conductive shaft 110, it has been found that the conductive shaft 110 being made of copper and having a length of less than 24 inches works well.

Figure 2:
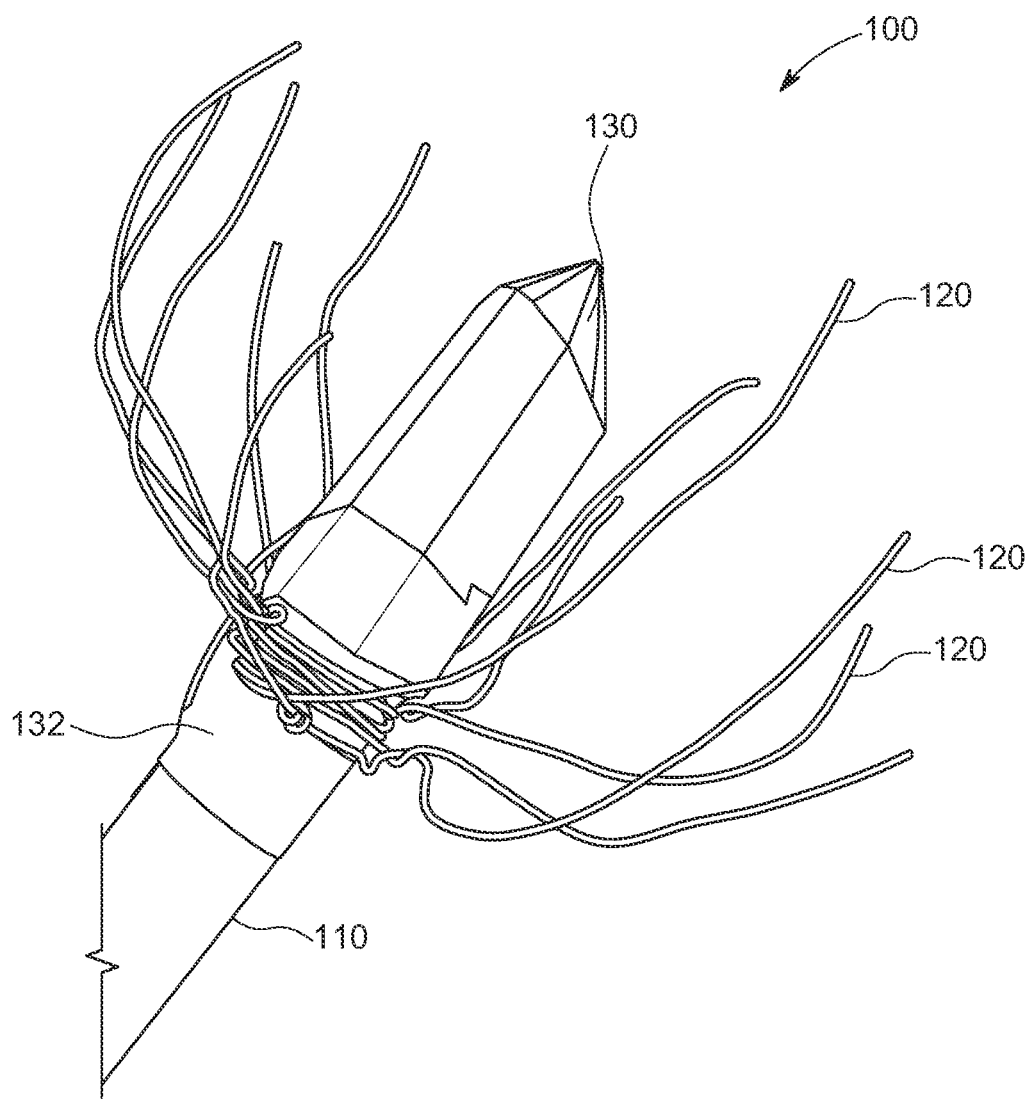
FIG. 2 illustrates an expanded view of an antenna-end of the apparatus for stimulating plant growth.

Referring to FIG. 2, an expanded view of an antenna-end of the apparatus for stimulating plant growth 100 is shown. In this view, the plurality of antennas 120 are made of conductive strands (e.g., copper wire) wrapped around the conductive tape 132, though in some embodiments, the plurality of antennas 120 are interfaced directly to the conductive shaft 110. In such, the plurality of antennas 120 are electrically and physically interfaced to the first end of the conductive shaft 110.

Figure 3:
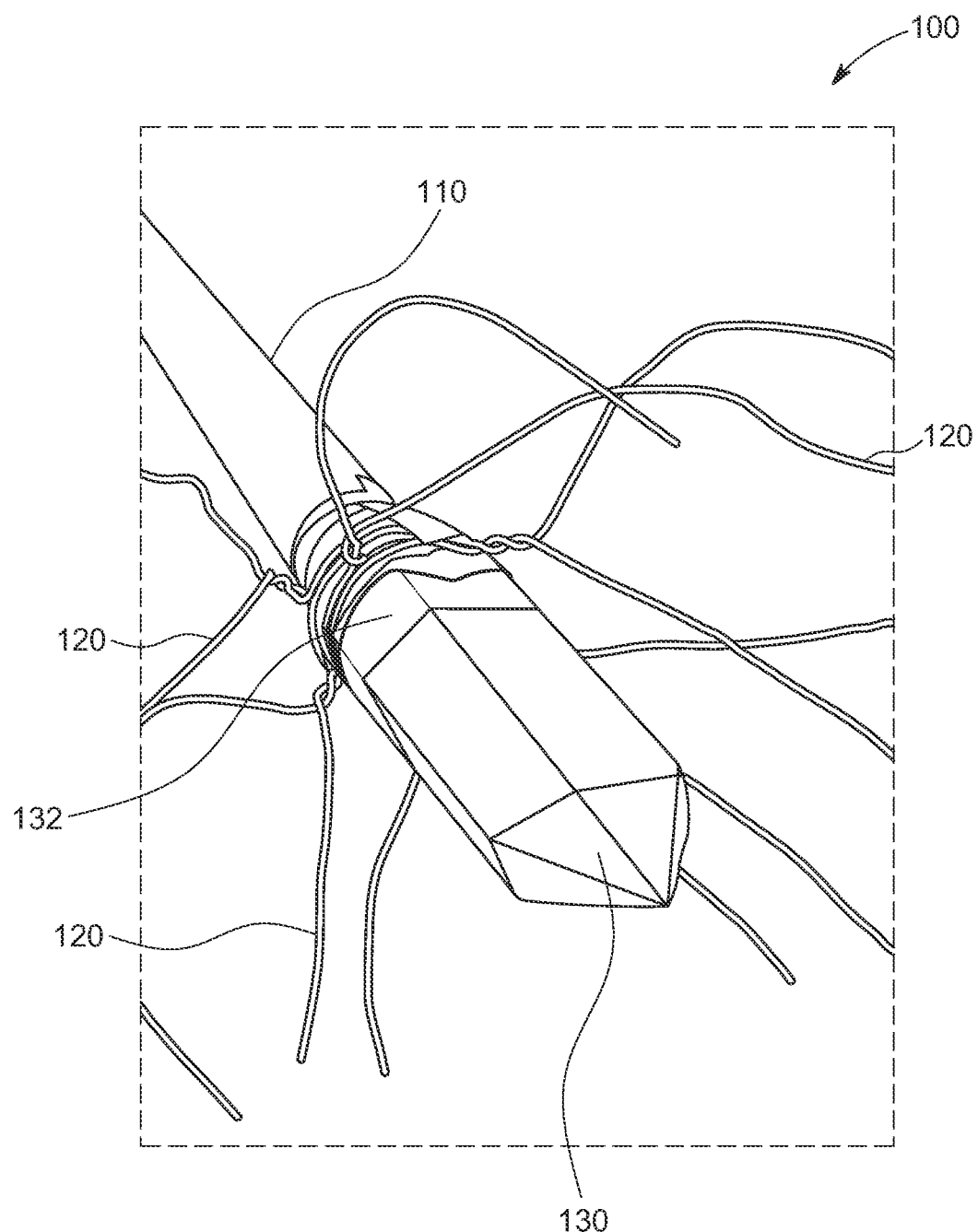
FIG. 3 illustrates a top view of the antenna-end of the apparatus for stimulating plant growth.

Referring to FIG. 3, a top view of the antenna-end of the apparatus for stimulating plant growth 100 is shown. Note that the plurality of antennas 120 are shown twist-tied around the conductive tape 132 as an example of connecting the plurality of antennas 120 to the conductive shaft 110, though any form of connection is anticipated including, but not limited to, press-fitting each antenna of the plurality of antennas 120 into holes in the conductive shaft 110, soldering each of the plurality of antennas 120 to the conductive shaft 110, welding, adhering with conductive adhesive or conductive tape, etc.

Figure 4:
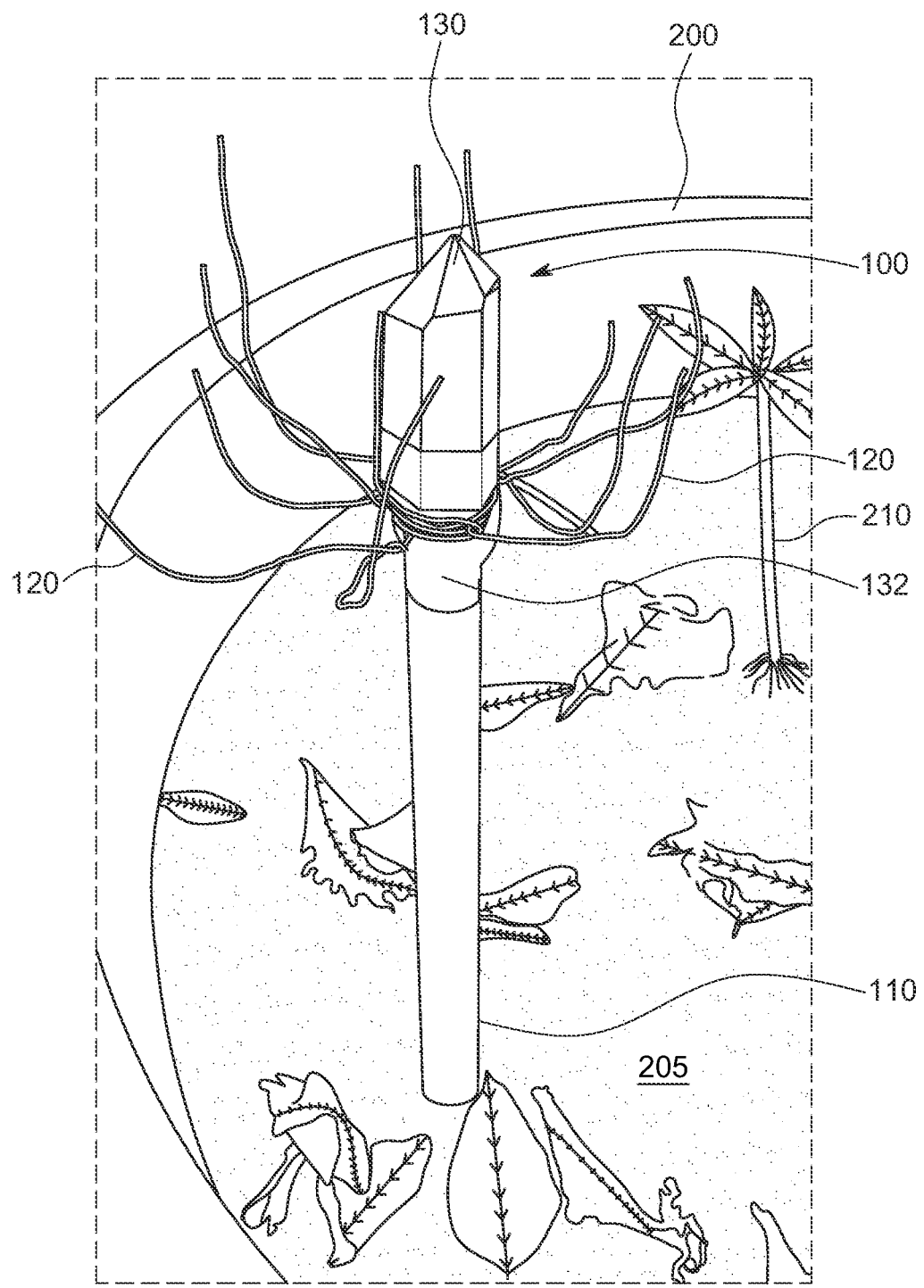
FIG. 4 illustrates a view of the apparatus for stimulating plant growth installed in soil near a plant.

Referring to FIG. 4, a view of the apparatus for stimulating plant growth 100 installed in soil near a plant 210 is shown. In this, the plurality of antennas 120 of the apparatus for stimulating plant growth 100 (and optionally, the quartz crystal 130) receive and transfer the small amounts of electric current to the first end of the conductive shaft 110 and, hence, through the conductive shaft 110 to a distal second end of the conductive shaft 110 that is inserted into the soil 205 within the planter 200. The small amounts of electric currents are then transferred to the plant(s) 210 by conduction within the soil 205 through water and salts within the soil 205, as it is known that water mixed with sodium chloride (salt) will conduct electricity.

Figure 5:
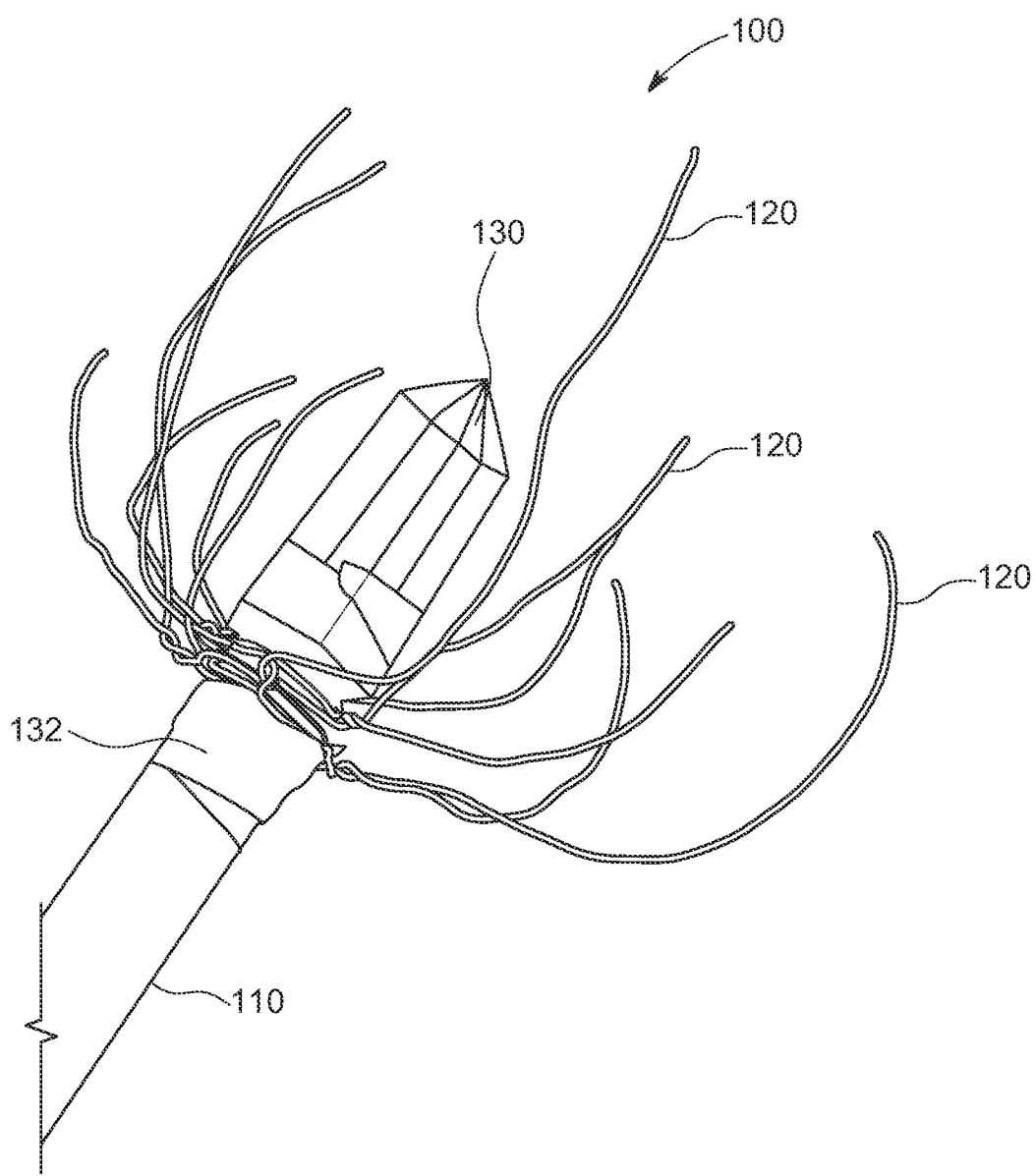
FIG. 5 illustrates another view of an antenna-end of the apparatus for stimulating plant growth.

Referring to FIG. 5, another view of an antenna-end of the apparatus for stimulating plant growth 100 is shown. In some embodiments, each antenna of the plurality of antennas 120 is made of a strand of copper wire. The small amounts of electric currents flow from the strands of copper wire through the conductive tape 132 (or directly to) the conductive shaft 110 and then down the conductive shaft 110 into the soil in which the conductive shaft 110 is inserted. The conductive shaft 110 is inserted into the soil 205 and the small amounts of electric current flow into the soil 205 and is conducted to the plant 210 though moisture and salts within the soil 205, thereby stimulating the plant 210 to grow at a faster, more productive rate, than a similar plant that is not provided with the small amounts of electric current. Note that although any type, shape, size, and composition of conductive shaft 110 is anticipated, a copper tube or pipe is shown in FIGS. 1-5. Other types of conductive shafts 110 are anticipated, including, but not limited to, steel tubing, iron tubing, aluminum tubing, copper rods, steel rods, iron rods, aluminum rods, non-tubular elongated metal objects, etc. In some embodiments, the conductive shaft 110 includes a non-conductive member and a conductive member such as a plastic tube having a conductive wire affixed to an outer surface or running internally to the plastic tube. Note that any support structure that will support the plurality of antennas 120, optionally the quartz crystal 130, and conduct electricity from the plurality of antennas 120 and optionally from the quartz crystal 130 and into the soil 205 is anticipated and included here within.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for stimulating plant growth, the apparatus comprising:
   a plurality of antennas, each antenna of the plurality of antennas is made of a strand of conductive material; and
   a conductive shaft that is elongated and is for transferring electric currents from the plurality of antennas into a soil, each antenna is electrically and physically connected to a first end of the conductive shaft.

2. The apparatus for stimulating plant growth of claim 1, wherein each antenna is a strand of copper wire.

3. The apparatus for stimulating plant growth of claim 1, wherein the plurality of antennas comprises 12 antennas made of copper wire, each of the 12 antennas being less than six inches long.

4. The apparatus for stimulating plant growth of claim 1, wherein the conductive shaft is a copper tube.

5. The apparatus for stimulating plant growth of claim 4, wherein the copper tube is less than or equal to 24 inches long.

6. The apparatus for stimulating plant growth of claim 4, wherein each antenna is interfaced to the first end of the copper tube by conductive tape.

7. The apparatus for stimulating plant growth of claim 1, further comprising a quartz crystal mounted to the first end of the conductive shaft.

8. The apparatus for stimulating plant growth of claim 7, wherein the quartz crystal is mounted to the first end of the conductive shaft by conductive tape.

9. The apparatus for stimulating plant growth of claim 7, wherein the quartz crystal is less than or equal to four inches long.

10. An apparatus for stimulating plant growth, the apparatus comprising:
    a plurality of antennas, each antenna of the plurality of antennas is made of a strand of copper wire;
    an elongated conductive shaft, each antenna is electrically and physically connected to a first end of the elongated conductive shaft by conductive tape; and
    a quartz crystal, the quartz crystal is electrically and physically connected to the first end of the elongated conductive shaft by conductive tape.

11. The apparatus for stimulating plant growth of claim 10, wherein the quartz crystal is less than or equal to four inches long.

12. The apparatus for stimulating plant growth of claim 10, wherein the plurality of antennas comprises 12 antennas made of copper wire and each of the plurality of antennas is less than or equal to six inches long.

13. The apparatus for stimulating plant growth of claim 10, wherein the elongated conductive shaft is a copper tube.

14. The apparatus for stimulating plant growth of claim 13, wherein the copper tube is less than or equal to 24 inches long.

15. A method of stimulating growth of a plant that is planted in soil, the method comprising:

physically and electrically connecting a plurality of antennas to a first end of a conductive shaft;
inserting a distal second end of the conductive shaft into the soil near the plant;
receiving electric currents at each antenna of the plurality of antennas;
conducting the electric currents into the conductive shaft;
the conductive shaft conducting the electric currents into the soil; and
moisture and salts within the soil conducting the electric currents to the plant for improving growth of the plant.

16. The method of claim 15, wherein the plurality of antennas comprises twelve antennas.

17. The method of claim 16, wherein each antenna of the plurality of antennas is a strand of copper wire and each strand of copper wire is less than or equal to six inches long.

18. The method of claim 15, wherein the conductive shaft is a copper tube and the copper tube is less than or equal to 24 inches long.

19. The method of claim 15, wherein each antenna is interfaced to the first end of the conductive shaft by conductive tape.

20. The method of claim 15, further comprising a quartz crystal mounted to the first end of the conductive shaft by conductive tape.

* * * * *